(12) United States Patent
Tazume

(10) Patent No.: US 11,747,807 B2
(45) Date of Patent: Sep. 5, 2023

(54) CONTROL DEVICE AND CONTROL METHOD FOR CONTROLLING AERIAL VEHICLE

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 310 days.

(21) Appl. No.: 16/972,695

(22) PCT Filed: Oct. 29, 2019

(86) PCT No.: PCT/JP2019/042345
§ 371 (c)(1),
(2) Date: Dec. 7, 2020

(87) PCT Pub. No.: WO2021/084610
PCT Pub. Date: May 6, 2021

(65) Prior Publication Data
US 2021/0373557 A1    Dec. 2, 2021

(51) Int. Cl.
| | | |
|---|---|---|
| *G05D 1/00* | (2006.01) | |
| *B64C 39/02* | (2023.01) | |
| *G01K 3/00* | (2006.01) | |
| *G05D 1/10* | (2006.01) | |
| *G06Q 10/083* | (2023.01) | |
| *B64U 101/00* | (2023.01) | |

(52) U.S. Cl.
CPC ......... *G05D 1/0088* (2013.01); *B64C 39/024* (2013.01); *G01K 3/005* (2013.01); *G05D 1/102* (2013.01); *B64U 2101/00* (2023.01); *G06Q 10/083* (2013.01)

(58) Field of Classification Search
CPC .... G05D 1/0088; G05D 1/102; B64C 39/024; B64C 2201/12
See application file for complete search history.

(56) References Cited

U.S. PATENT DOCUMENTS

| | | | |
|---|---|---|---|
| 10,023,297 B1 | 6/2018 | Beckman et al. | |
| 10,023,298 B1 | 6/2018 | Beckman et al. | |
| 10,043,263 B1 * | 8/2018 | Fryshman | A01M 7/00 |

(Continued)

FOREIGN PATENT DOCUMENTS

| | | |
|---|---|---|
| JP | 2007-245797 A | 9/2007 |
| JP | 2012-037204 A | 2/2012 |

(Continued)

OTHER PUBLICATIONS

Machine Translation of KR 20190086993 (Year: 2018).*
International Search Report of PCT/JP2019/042345 dated Dec. 24, 2019 [PCT/ISA/210].

*Primary Examiner* — Anne Marie Antonucci
*Assistant Examiner* — Justyn Trott
(74) *Attorney, Agent, or Firm* — Sughrue Mion, PLLC

(57) ABSTRACT

The control device is configured to control an aerial vehicle that carries a carrying object and includes a sensor capable of measuring a ground surface temperature during flight. The control device acquires a ground surface temperature in an area where the carrying object is planned to be released, the ground surface temperature being measured by the sensor. And then, the control unit performs control regarding release of the carrying object in accordance with the ground surface temperature in the area.

15 Claims, 7 Drawing Sheets

(56) References Cited

U.S. PATENT DOCUMENTS

| | | | | |
|---|---|---|---|---|
| 10,402,774 B1* | 9/2019 | Phillips | ................... | G06N 20/00 |
| 2017/0363479 A1* | 12/2017 | Harvey | ..................... | G01K 3/04 |
| 2018/0265222 A1 | 9/2018 | Takagi | | |
| 2019/0019141 A1 | 1/2019 | Torii et al. | | |
| 2019/0340569 A1* | 11/2019 | Prager | .............. | G06Q 10/06315 |
| 2020/0207474 A1* | 7/2020 | Foggia | ................. | G05D 1/0676 |

FOREIGN PATENT DOCUMENTS

| | | | | | |
|---|---|---|---|---|---|
| JP | 2017-083063 | A | | 5/2017 | |
| JP | 2017-087898 | A | | 5/2017 | |
| JP | 2017-105242 | A | | 6/2017 | |
| JP | 2019-525864 | A | | 9/2019 | |
| KR | 20190086993 | A | * | 1/2018 | |
| WO | 2017/115446 | A1 | | 7/2017 | |
| WO | WO-2017137393 | A1 | * | 8/2017 | ............. G08B 17/10 |

* cited by examiner

CONTROL DEVICE AND CONTROL METHOD FOR CONTROLLING AERIAL VEHICLE

CROSS REFERENCE TO RELATED APPLICATIONS

This application is a National Stage of International Application No. PCT/JP2019/042345, filed Oct. 29, 2019.

TECHNICAL FIELD

The present invention relates to a technical field of a control method and the like executed by a system that controls an aerial vehicle including a sensor capable of measuring a ground surface temperature during flight.

BACKGROUND ART

In recent years, study has been made on a technology in which a carrying object such as cargo is carried to a destination and transferred by an aerial vehicle capable of flying unmanned. For example, Patent Literature 1 discloses a technology in which when a carrier (aerial vehicle) arrives at a destination, the carrier hovers and unreels a main wire downward until a carried cargo lands on the ground, and when the cargo has landed, the cargo is separated from the carrier.

CITATION LIST

Patent Literature

Patent Literature 1: JP 2017-87898 A

SUMMARY OF INVENTION

Technical Problem

However, in a case where a ground surface temperature in an area where a carrying object is planned to be released from an aerial vehicle is high, the carrying object may be adversely affected. Moreover, in a case where the aerial vehicle lands on the area having a high ground surface temperature, the aerial vehicle itself may also be adversely affected regardless of whether or not the aerial vehicle carries the carrying object.

Therefore, one or more embodiments of the present invention are directed to provide a control device and a control method that are capable of preventing a carrying object or an aerial vehicle from being adversely affected by the ground surface temperature.

Solution to Problem

In response to the above issue, an aspect of the disclosure provides a control device configured to control an aerial vehicle that carries a carrying object and includes a sensor capable of measuring a ground surface temperature during flight. The control device includes: an acquisition unit configured to acquire a ground surface temperature in an area where the carrying object is planned to be released, the ground surface temperature being measured by the sensor; and a control unit configured to perform control regarding release of the carrying object in accordance with the ground surface temperature in the area. This makes it possible to prevent the carrying object from being adversely affected by the ground surface temperature in the area where the carrying object is planned to be released.

An aspect of the disclosure provides the control device, wherein in a case where the ground surface temperature in the area is less than a threshold value, the control unit causes the carrying object to descend while making the aerial vehicle hover in order to release the carrying object. This makes it possible to more promptly release the carrying object in the area having the ground surface temperature less than the threshold value.

An aspect of the disclosure provides the control device, wherein in a case where the ground surface temperature in the area is less than a threshold value, the control unit causes the aerial vehicle to land in order to release the carrying object. This makes it possible to more promptly release the carrying object in the area having the ground surface temperature less than the threshold value.

An aspect of the disclosure provides the control device, wherein in a case where the ground surface temperature in the area is the threshold value or more, the control unit performs control to decrease the ground surface temperature, confirms a fact that the ground surface temperature has become less than the threshold value, and then causes the carrying object to descend while making the aerial vehicle hover in order to release the carrying object. Thus, even when the ground surface temperature in the area where the carrying object is planned to be released is the threshold value or more, it is possible to more promptly release the carrying object after decreasing the ground surface temperature to a temperature less than the threshold value.

An aspect of the disclosure provides the control device, wherein in a case where the ground surface temperature in the area is the threshold value or more, the control unit performs control to decrease the ground surface temperature, confirms a fact that the ground surface temperature has become less than the threshold value, and then causes the aerial vehicle to land in order to release the carrying object. Thus, even when the ground surface temperature in the area where the carrying object is planned to be released is the threshold value or more, it is possible to more promptly release the carrying object after decreasing the ground surface temperature to a temperature less than the threshold value.

An aspect of the disclosure provides the control device, wherein in a case where the ground surface temperature in the area is the threshold value or more, the control unit confirms a fact that a receiving side of the carrying object to be released in the area is prepared for reception, and then causes the carrying object to descend while making the aerial vehicle hover in order to release the carrying object. Thus, even when the ground surface temperature in the area where the carrying object is planned to be released is the threshold value or more, it is possible to more promptly release the carrying object in the area and transfer to the receiving side.

An aspect of the disclosure provides the control device, wherein in a case where the ground surface temperature in the area is the threshold value or more, the control unit confirms a fact that a receiving side of the carrying object to be released in the area is prepared for reception, and then causes the aerial vehicle to land in order to release the carrying object. Thus, even when the ground surface temperature in the area where the carrying object is planned to be released is the threshold value or more, it is possible to more promptly release the carrying object in the area and transfer to the receiving side.

An aspect of the disclosure provides the control device wherein the control unit issues a confirmation notice to the receiving side of the carrying object, and confirms the fact that the receiving side is prepared for reception by receiving an answer indicating completion of preparation from the receiving side. This makes it possible to more surely confirm the fact that the receiving side is prepared to receive the carrying object.

An aspect of the disclosure provides the control device, wherein the control unit confirms the fact that the receiving side is prepared for reception by recognizing the receiving side of the carrying object from an image captured by a camera provided in the aerial vehicle. This makes it possible to more surely confirm the fact that the receiving side is prepared to receive the carrying object.

An aspect of the disclosure provides the control device, wherein in a case where the ground surface temperature in the area is a threshold value or more, the control unit moves the aerial vehicle to an area different from the area in order to release the carrying object. Thus, even when the ground surface temperature in the area where the carrying object is planned to be released is the threshold value or more, it is possible to move the aerial vehicle to the different area and take appropriate measures.

An aspect of the disclosure provides the control device further including a selection unit configured to select, as a spot where the carrying object is released, a spot where the ground surface temperature is less than the threshold value on the basis of distribution of ground surface temperatures at a plurality of spots inside the area. This makes it possible to release the carrying object at an appropriate spot in accordance with the ground surface temperature in the area where the carrying object is planned to be released.

An aspect of the disclosure provides the control device, wherein the threshold value is set in accordance with a category of the carrying object. This makes it possible to take appropriate measures in accordance with: the category of the carrying object; and the ground surface temperature in the area where the carrying object is planned to be released.

An aspect of the disclosure provides the control device, wherein the aerial vehicle carries a plurality of carrying objects of different categories, and the selection unit selects, as a spot where the carrying object is released, a spot where the ground surface temperature is less than the threshold value for each of the carrying objects on the basis of the distribution of the ground surface temperatures at the plurality of spots inside the area. This makes it possible to release the carrying object at an appropriate spot in accordance with: the category of each of the plurality of carrying objects; and the ground surface temperature in the area where each of the carrying objects is to be released.

An aspect of the disclosure provides a control method executed by a system that controls an aerial vehicle configured to carry a carrying object, the aerial vehicle including a sensor capable of measuring a ground surface temperature during flight. The control method includes: a step of acquiring a ground surface temperature in an area where the carrying object is released, the ground surface temperature being measured by the sensor; and a step of performing control regarding release of the carrying object in accordance with the ground surface temperature in the area.

An aspect of the disclosure provides a control device configured to control an aerial vehicle that includes a sensor capable of measuring a ground surface temperature during flight. The control device includes: an acquisition unit configured to acquire a ground surface temperature in an area where the aerial vehicle is planned to land, the ground surface temperature being measured by the sensor; and a control unit configured to perform control regarding landing of the aerial vehicle in accordance with the ground surface temperature in the area. This makes it possible to prevent the aerial vehicle from being adversely affected by the ground surface temperature in the area where the aerial vehicle is planned to land.

Advantageous Effect of the Invention

According to one or more embodiments of the present invention, it is possible to prevent the carrying object or the aerial vehicle from being adversely affected by the ground surface temperature in the area where the carrying object is planned to be released.

DESCRIPTION OF EMBODIMENTS

Hereinafter, an embodiment of the present invention will be described with reference to the drawings. Incidentally, the embodiment described below is an embodiment of a case where a present invention is applied to a flight system.

[1. Configuration and Outline of Operation of Flight System S]

Figure 1:
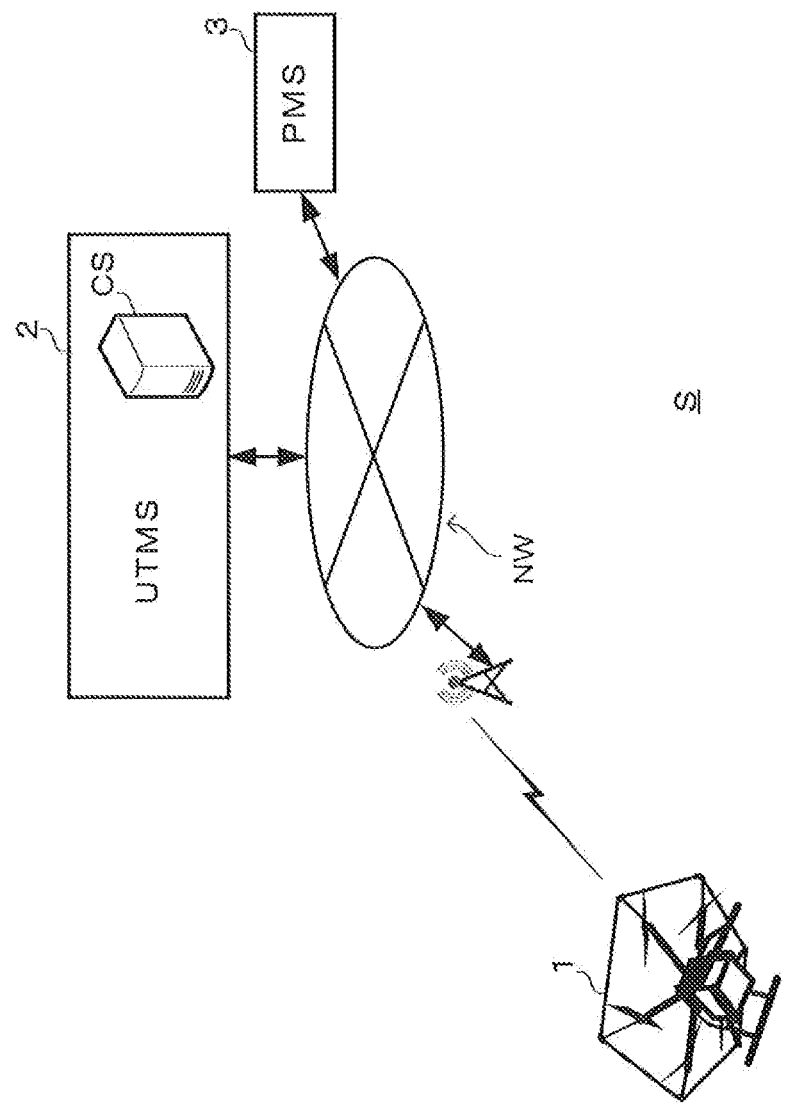
FIG. 1 is a diagram illustrating a schematic configuration example of a flight system S.

First, referring to FIG. 1, a description will be provided for an outline of a configuration and operation of a flight system S by which an aerial vehicle capable of flying unmanned is made to fly for a predetermined purpose. Although examples of the predetermined purpose can include carrying (transportation), surveying, image capturing, inspection, monitoring, and the like, the following embodiments describe the case where an unmanned aerial vehicle flies for the purpose of carrying the carrying object as an example. FIG. 1 is a diagram illustrating a schematic configuration example of the flight system S. As illustrated in FIG. 1, the flight system S includes: an unmanned aerial vehicle (hereinafter referred to as an "UAV (Unmanned Aerial Vehicle)") 1 that flies in atmosphere (in air); a traffic management system (hereinafter referred to as a "UTMS (UAV Traffic Management System)") 2; and a port management system (hereinafter referred to as a "PMS (Port Management System)") 3. The UAV 1, the UTMS 2, and the PMS 3 can communicate with one another via a communication network NW. The communication network NW includes, for example, the Internet, a mobile communication network, a radio base station thereof, and the like. Incidentally, although one UAV 1 is shown in the example of FIG.

1, there may be a plurality of UAVs 1. The UTMS 2 and the PMS 3 may be configured as one management system.

The UAV 1 can fly in accordance with remote operation from the ground by an operator or can fly autonomously in order to carry a carrying object to a predetermined area. Here, the predetermined area is an area having, for example, an area size larger than a plane size of the UAV 1 (for example, an area size of about several tens of cm$^2$ to several tens of m$^2$), and is an area (hereinafter, referred to as a "planned release area") where the carrying object is planned to be released from the UAV 1. Examples of the planned release area include not only a building rooftop, a park or a school playground, an empty land, and the like but also, for example, an area having an evacuation place in the event of an emergency such as a disaster. Inside the planned release area, there is also a case where a takeoff and landing facility (hereinafter referred to as a "port") organized for takeoff and landing of the UAV 1 is installed. Examples of the carrying object include an article, a person, an animal, and the like, but an article will be exemplified as the carrying object in the following embodiment. Examples of the article include a product, a home delivery parcel, evacuation supplies, relief supplies, and the like, but may also include any cargo that can be carried by the UAV 1. Incidentally, there is also a case where the UAV 1 carries a plurality of articles of different categories at a time. The UAV 1 is also called a drone or a multi-copter. The UAV 1 is managed by a GCS (Ground Control Station). For example, the GCS is installed as an application in a control terminal that can be connected to the communication network NW. In this case, the operator is, for example, a person who operates the control terminal to remotely control the UAV 1. Alternatively, the GCS may be configured by a server or the like. In this case, the operator is, for example, a manager in the GCS or a controller provided in the server.

The UTMS 2 includes one or more servers including control server CS. The control server CS is an example of the control device. The UTMS 2 manages traffic and flight of the UAV 1. The traffic management of the UAV 1 includes management of a traffic plan of the UAV 1; management of a flight status of the UAV 1, and control of the UAV 1. The traffic plan of the UAV 1 is a flight plan including, for example, a flight route (scheduled route) from a departure point (flight start point) to the planned release area (the planned release area may include the port) for the UAV 1. The flight route is represented by, for example, latitude and longitude on the route, and may include flight altitude. The management and control of the flight status of the UAV 1 is performed on the basis of aircraft information of the UAV 1. The aircraft information of the UAV 1 includes at least positional information of the UAV 1. The positional information of the UAV 1 indicates the current position of the UAV 1. The current position of the UAV 1 is a flight position of the UAV 1 in flight. The aircraft information of the UAV 1 may include speed information of the UAV 1. The speed information indicates a flight speed of the UAV 1.

The PMS 3 includes one or a plurality of servers and the like. The PMS 3 manages, for example, a port installed inside the planned release area. The port is managed on the basis of port positional information, port reservation information, and the like. Here, the port positional information indicates an installation position of the port. The port reservation information includes: an aircraft ID of the UAV 1 that has reserved the port; information on scheduled arrival time; and the like. The aircraft ID of the UAV 1 is identification information to identify the UAV 1. The port is utilized to transfer an article carried (e.g., delivered) by the UAV 1. For example, the article is transferred to a receiving side (for example, a person, or an unmanned ground vehicle (UGV)) by releasing the article from the UAV 1 that has landed on the port. Alternatively, the article is transferred to a receiving side by releasing the article when the article is made to descend and reaches the ground by using a reel, a winch, or the like from the UAV 1 that is hovering in the sky above the port or when the article reaches a height of several meters from the ground. Incidentally, there is also a case where the article is transferred to the receiving side by dropping the article (that is, releasing the article in the sky) from the UAV 1 that hovers in the sky above the port.

By the way, there is a case where the article released from the UAV 1 at the port is not immediately transferred to the receiving side of the article, and kept unattended on the port for about several tens of minutes, for example. Since the port is generally provided on the flat and hard ground well-viewed from the sky (for example, concrete ground), the port is likely to receive a large amount of direct sunlight and a surface thereof tends to have a high temperature (for example, there is also a case where a surface temperature of the port exceeds 60° C. under the blazing sun). Therefore, when the article is kept unattended on the port, the article may be adversely affected depending on a category thereof (particularly, a refrigerated or frozen food, a fresh food, or the like), and for example, rapid quality degradation is caused in the article. This also depends on an attribute of the ground (for example, concrete, soil, lawn, or the like), but the similar applies to a case where the article is kept unattended in a place other than a port. In the present embodiment, control regarding release of the article is performed in accordance with a ground surface temperature in the planned release area of the article. The control regarding release of the article may be performed by the UAV 1, may be performed by the control server CS, or may be performed in cooperative operation of the UAV 1 and the control server CS. Incidentally, there is also a case where a port is provided with a cooling device that cools the port. In this case, it is preferable that the cooling device be driven in accordance with a drive control command from the UAV 1 or the control server CS. It is preferable that information related to whether or not the port is provided with the cooling device be managed by the PMS 3.

[1-1. Configuration and Outline of Functions of UAV 1]

Figure 2:
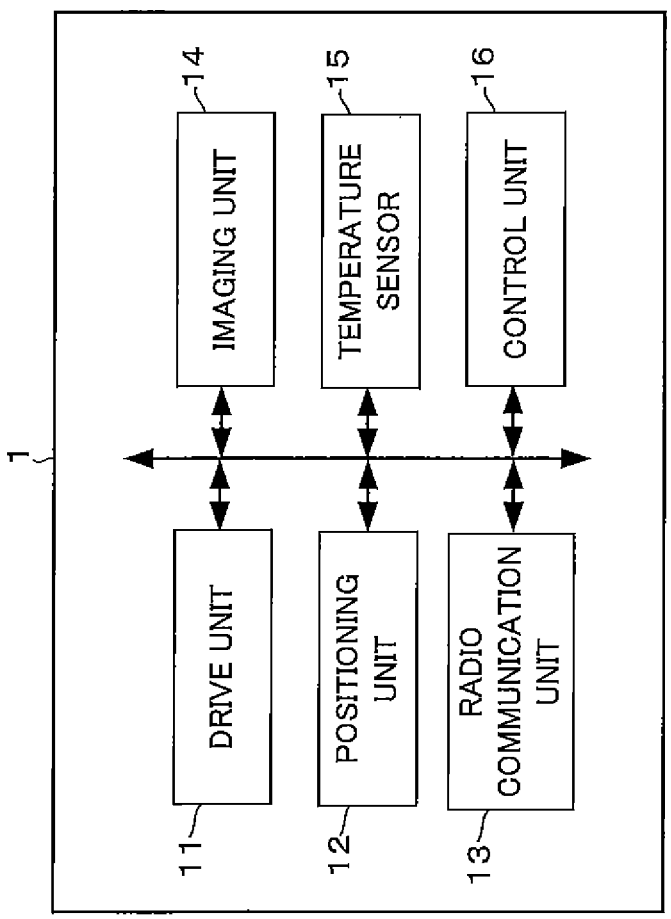
FIG. 2 is a diagram illustrating a schematic configuration example of an UAV 1.

Next, a configuration and an outline of functions of the UAV 1 will be described with reference to FIG. 2. FIG. 2 is a diagram illustrating a schematic configuration example of the UAV 1. As illustrated in FIG. 2, the UAV 1 includes a drive unit 11, a positioning unit 12, a radio communication unit 13, an imaging unit 14, a temperature sensor 15, a control unit 16, and the like. The control unit 16 is an example of the control device. Incidentally, although not illustrated, the UAV 1 includes a rotor (propeller) that is a horizontal rotary blade, various sensors, an article holding mechanism capable of holding and releasing the article to be carried, a battery that supplies power to each of the units of the UAV 1, and the like. The article holding mechanism may be capable of holding and releasing each of a plurality of articles. The article holding mechanism is controlled by the control unit 16 so as to be able to release the article (for example, open arms that grip the article by a motor driving, and the like). Moreover, the UAV 1 includes a reel or a winch that can unreel a wire, and the article may be connected to a tip of the wire. In this case, the article holding mechanism may be: a mechanism that is located at a portion connecting the article and the wire and descends together with the article; or a mechanism that releases the article together with the wire (for example, by cutting the wire) without descending. Moreover, the UAV 1 may include a sprinkling mechanism to drop (sprinkle) liquid (e.g., water) in order to cool the ground inside the planned release area. The sprinkling mechanism includes: a tank that stores the water; a sprinkler that drops the water; and the like. Moreover, various sensors used for flight control of the UAV 1 include a barometric sensor, a triaxial acceleration sensor, a geomagnetic sensor, and the like. Detection information detected by the various sensors is output to the control unit 16.

The drive unit 11 includes a motor, a rotating shaft, and the like. The drive unit 11 rotates the rotors with the motor, the rotating shaft, and the like that are driven in accordance with a control signal output from the control unit 16. The positioning unit 12 includes a radio wave receiver, an altitude sensor, and the like. For example, the positioning unit 12 receives, by the radio wave receiver, a radio wave sent from a satellite of a GNSS (Global Navigation Satellite System) and detects a current position (latitude and longitude) in a horizontal direction of the UAV 1 on the basis of the radio wave. The current position of UAV 1 is the flight position of UAV 1 in flight. Incidentally, the current position in the horizontal direction of the UAV 1 may be corrected on the basis of an image captured by the imaging unit 14 or a radio wave sent from the radio base station. Further, the positioning unit 12 may detect the current position (altitude) in a vertical direction of the UAV 1 with the altitude sensor. The positional information indicating the current position detected by the positioning unit 12 is output to the control unit 16.

The radio communication unit 13 controls communication performed via the communication network NW. The imaging unit 14 includes a camera and the like. The camera is used for the flight control of the UAV 1. The imaging unit 14 continuously captures images of a real space within a range included in an angle of view of the camera. Image data captured by the imaging unit 14 is output to the control unit 16. The temperature sensor 15 is a sensor capable of measuring the ground surface temperature from the sky during flight of the UAV 1, and includes, for example, an infrared thermography. Ground surface temperature distribution data indicating ground surface temperatures measured by the temperature sensor 15 is output to the control unit 16.

The control unit 16 includes a CPU (Central Processing Unit) which is a processor, a ROM (Read Only Memory), a RAM (Random Access Memory), a non-volatile memory, and the like. The control unit 15 executes various kinds of control for the UAV 1 in accordance with a control program stored in, for example, the ROM or the non-volatile memory. The various kinds of control include takeoff control, flight control, and landing control. In the flight control and the landing control, the positional information acquired from the positioning unit 12, the image data acquired from the imaging unit 14, the detection information acquired from the various sensors, and the flight plan information indicating a flight plan are used to control a rotation speed of the rotor, and a position, a posture, and a traveling direction of the UAV 1. Here, the flight plan information is acquired from, for example, the GCS or the UTMS2. The flight plan information includes positional information of the planned release area. The control unit 16 can control the flight with the remote operation or the autonomous flight of the UAV1 to the planned release area according to the positional information of the planned release area. Incidentally, the autonomous flight of the UAV 1 is not limited to the autonomous flight performed under the flight control of the control unit 16 provided in the UAV 1, and the autonomous flight of the UAV 1 also includes autonomous flight performed by the flight control as the entire flight system S, for example.

Further, the control unit 16 causes the temperature sensor 15 to measure the ground surface temperature in the planned release area at the time of, for example, reaching the planned release area, and acquires, from the temperature sensor 15, the measured ground surface temperature (ground surface temperature distribution data) in the planned release area. Incidentally, in the ground surface temperature distribution data, it is preferable that latitude and longitude of each spot be correlated to the ground surface temperature at each spot in the planned release area. Then, the control unit 16 varies subsequent processing associated with release of the article by the performing the control regarding the release of the article in accordance with the ground surface temperature in the planned release area. For example, when the ground surface temperature in the planned release area is less than a threshold value, the control unit 16 causes the article to descend to the inside of the planned release area by a reel, a winch, or the like while making the UAV 1 hover in order to release the article. Consequently, the article can be more promptly released in the planned release area where the ground surface temperature is less than the threshold value. Here, the hovering state is not limited to a state in which the UAV 1 is completely stationary in the air, and the UAV 1 may be slightly moved (that is, moved in a horizontal direction, a vertical direction, or a diagonal direction) (that is, the UAV 1 may float in the air without landing). Alternatively, in a case where the ground surface temperature in the planned release area is less than the threshold value, the control unit 16 may cause the UAV 1 to land inside the planned release area in order to release the article. Consequently, the article can be more appropriately (safely) released in the planned release area where the ground surface temperature is less than the threshold value. Incidentally, the threshold value may be set in accordance with a category of the article.

On the other hand, in a case where the ground surface temperature in the planned release area is the threshold value or more, the control unit 16 may perform control to decrease the ground surface temperature in the planned release area, and confirm that the ground surface temperature has become less than the threshold value. Here, as exemplary control to decrease the ground surface temperature in the planned release area, the control unit 16 drives, for example, the sprinkling mechanism of the UAV 1 to drop (sprinkle) the water. In a case where the article is released on a port inside the planned release area or in a case where the UAV 1 lands on the port, the control unit 16 may transmit a drive control command to a cooling device to drive the cooling device, and may cool the port in a case where the port is provided with the cooling device. Then, after confirming that the ground surface temperature in the planned release area has become less than the threshold value, the control unit 16 causes the article to descend to the inside of the planned release area while making the UAV 1 hover, or causes the UAV 1 to land in order to release the article. Consequently, even when the ground surface temperature in the planned release area is the threshold value or more, the article can be released after the ground surface temperature is decreased to the temperature less than the threshold value.

Moreover, in a case where the ground surface temperature in the planned release area is the threshold value or more, the control unit 16 may move the UAV 1 to an area different from the planned release area in order to release the article. A purpose of such movement is to: (i) release the article in the different area (such as another port) in order to transfer the article to the receiving side of the article; (ii) land in the different area to wait until the ground surface temperature is decreased; (iii) give up transferring the article to the receiving side and collect the article in the different area (may be a departure spot or another place); or the like. Consequently, even when the ground surface temperature in the planned release area is the threshold value or more, it is possible to take appropriate measures by moving the UAV 1 to the different area.

Moreover, even when the ground surface temperature in the planned release area is the threshold value or more, the control unit 16 may confirm a fact that the receiving side of the article to be released in the planned release area is prepared for reception, and then the control unit may cause the UAV 1 to descend while making the UAV 1 hover or cause the UAV 1 to land in order to release the article. Consequently, even when the ground surface temperature in the planned release area is the threshold value or more, the article can be released in the planned release area and transferred to the receiving side (that is, can be transferred without placing the article on the ground). Here, the fact that the receiving side is prepared for reception is confirmed by, for example, the control unit 16 recognizing the receiving side of the article from image data captured by the imaging unit 14. Consequently, the fact that the receiving side is prepared to receive the article can be more promptly confirmed. More specifically, the control unit 16 collates face image data of a person registered in advance with face image data of a person captured by the imaging unit 14, and in a case where a coincidence degree between the faces is a threshold value or more, the receiving side of the article is recognized (authenticated). Alternatively, the control unit 16 collates mark image data of a UGV registered in advance with mark image data of the UGV (that is, a mark attached onto a surface of the UGV) captured by the imaging unit 14, and in a case where a coincidence degree between the marks is a threshold value or more, the receiving side of the article may be recognized (authenticated).

Incidentally, whether or not the ground surface temperature in the planned release area is less than the threshold value or the threshold value or more may be determined (confirmed) by the control unit 16 or by the control server CS. In the latter case, the control unit 16 transmits ground surface temperature distribution data indicating the ground surface temperature in the planned release area to the control server CS via the radio communication unit 13 together with an aircraft ID and aerial vehicle information of the UAV 1. Then, in response to a release control command from the control server CS or a GCS, the control unit 16 causes the article to descend while making the UAV 1 hover or causes the UAV 1 to land in order to release the article. Alternatively, the control unit 16 may move the UAV 1 to an area different from the planned release area in response to a movement control command from the control server CS or the GCS.

By the way, distribution of ground surface temperatures in the planned release area is not always constant. That is, assumed is a case where the ground surface temperature in a certain portion inside the planned release area is different from a ground surface temperature in another portion inside the planned release area. The larger the planned release area is, the more significant this is. Therefore, in a case where the distribution of the ground surface temperatures in the planned release area is not constant, it is preferable to determine, for example, whether or not a minimum value of the ground surface temperature inside the planned release area is less than the threshold value. As another example, a spot where a ground surface temperature is less than the threshold value may be selected as a spot where the article is to be released (hereinafter referred to as a "release spot") on the basis of the distribution of ground surface temperatures at a plurality of spots inside the planned release area. Consequently, the article can be released at an appropriate release spot in accordance with the ground surface temperature in the planned release area.

An area size of a release spot of the article may be, for example, an area size close to a plane size of the article (in other words, the area of a ground contact surface of the article) or an area size larger than a plane size of the UAV 1. The release spot of the article may also be selected by the control unit 16 or by the control server CS. In the latter case, positional information of the release spot of the article is indicated by a release control command from the control server CS or the GCS. Then, in response to the release control command, the control unit 16 causes the article to descend to the release spot indicated by the release control command while making the UAV 1 hover, or causes the UAV 1 to land on the release spot. Consequently, frequency of determining that the ground surface temperature in the planned release area is the threshold value or more is decreased, and therefore, a load on the UAV 1 or the control server CS can be reduced, and power consumption of the UAV 1 can be reduced.

[1-2. Configuration and Outline of Functions of Control Server CS]

Figure 3:
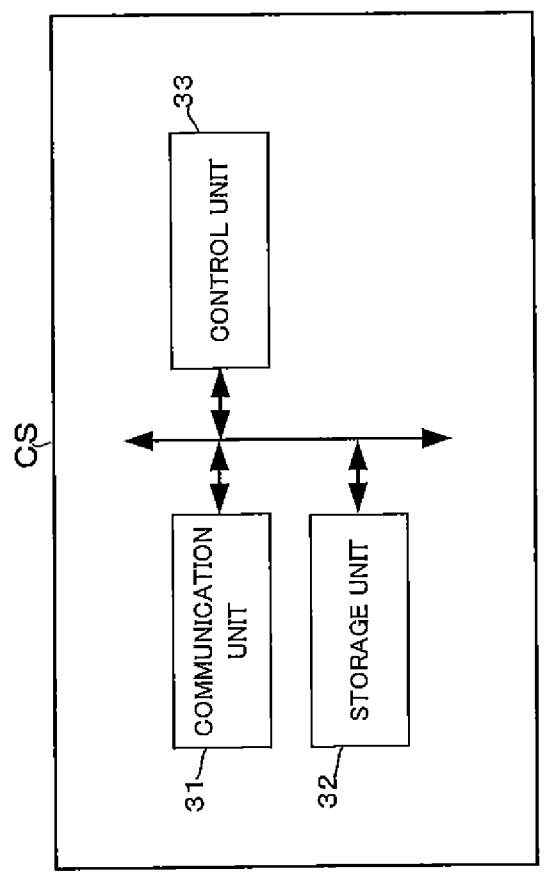
FIG. 3 is a diagram illustrating a schematic configuration example of a control server CS.
Figure 4:
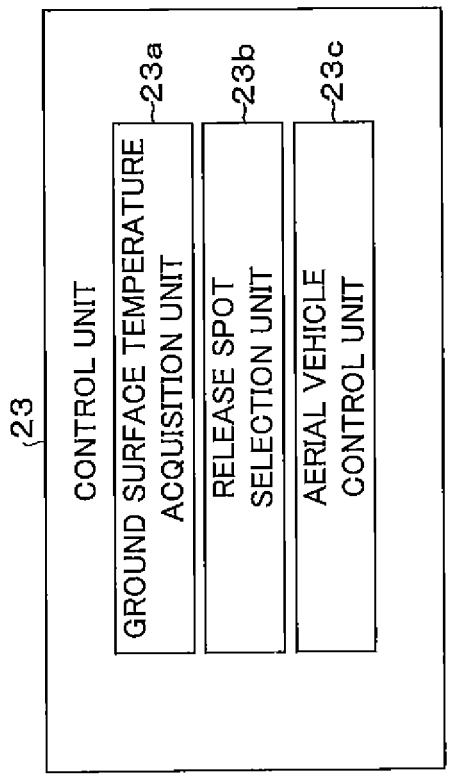
FIG. 4 is a diagram illustrating exemplary functional blocks in a control unit 23.

Next, a configuration and an outline of functions of the control server CS will be described with reference to FIGS. 3 and 4. FIG. 3 is a diagram illustrating a schematic configuration example of the control server CS. As illustrated in FIG. 3, the control server CS includes a communication unit 21, a storage unit 22, a control unit 23, and the like. The communication unit 21 controls communication performed via a communication network NW. The storage unit 22 includes, for example, a hard disk drive and the like. The storage unit 22 stores map data of an area where the UAV 1 can fly. The map data includes positional information (e.g., latitude and longitude) of each spot in the area where the UAV 1 can fly.

Moreover, in the storage unit 22, article management information is stored in a manner categorized per article. The article management information includes, for example, an article ID of the article, a category of the article, positional information of the planned release area of the article, an aircraft ID of the UAV 1 that carries the article, and information of a receiving side of the article. Here, the article ID is identification information that identifies the article. The information of the receiving side of the article includes an e-mail address of a user who receives the article in the planned release area, a user ID of the user, and the like. The user ID is identification information that identifies the user. Alternatively, the information of the receiving side of the article includes a communication address (e.g., an IP address) to access a UGV that receives the article in the planned release area, an e-mail address of a user who utilizes the UGV, a user ID of the user, and the like. The information of the receiving side of the article may also include face image data of a user who receives the article or mark image data of a UGV that receives the article.

The control unit 23 includes: a CPU that is a processor; a ROM; a RAM; a non-volatile memory; and the like. FIG. 4 is a diagram illustrating exemplary functional blocks in the control unit 23. The control unit 23 functions as a ground surface temperature acquisition unit 23a, a release spot selection unit 23b, an aerial vehicle control unit 23c, and the like as illustrated in FIG. 4 in accordance with a program stored in, for example, a ROM or a non-volatile memory. The ground surface temperature acquisition unit 23a is an example of an acquisition unit. The release spot selection unit 23b is an example of a selection unit.

The ground surface temperature acquisition unit 23a acquires, from the UAV 1, a ground surface temperature in the planned release area together with an aircraft ID of the UAV 1 at a predetermined time interval, for example, in which the ground surface temperature is measured by the temperature sensor 15 of the UAV 1. The release spot selection unit 23b selects, as a release spot of the article, a spot where the ground surface temperature is less than a threshold value on the basis of distribution of ground surface temperatures in a plurality of spots inside the planned release area, and acquires positional information of the release spot. Here, it is preferable to set the threshold value in accordance with a category of the article. Incidentally, in a case where the UAV 1 carries a plurality of articles of different categories, the ground surface temperature acquisition unit 23a selects, as a release spot of each of the articles, a spot where the ground surface temperature is less than a threshold value for each of the articles (for example, the threshold value set in accordance with a category of each of the articles) on the basis of the distribution of the ground surface temperatures in the plurality of spots inside the planned release area, and acquires positional information of each of the release spots. Consequently, the articles can be released at appropriate release spots in accordance with the respective categories of the plurality of articles and the respective ground surface temperatures in the planned release area.

Figure 5:
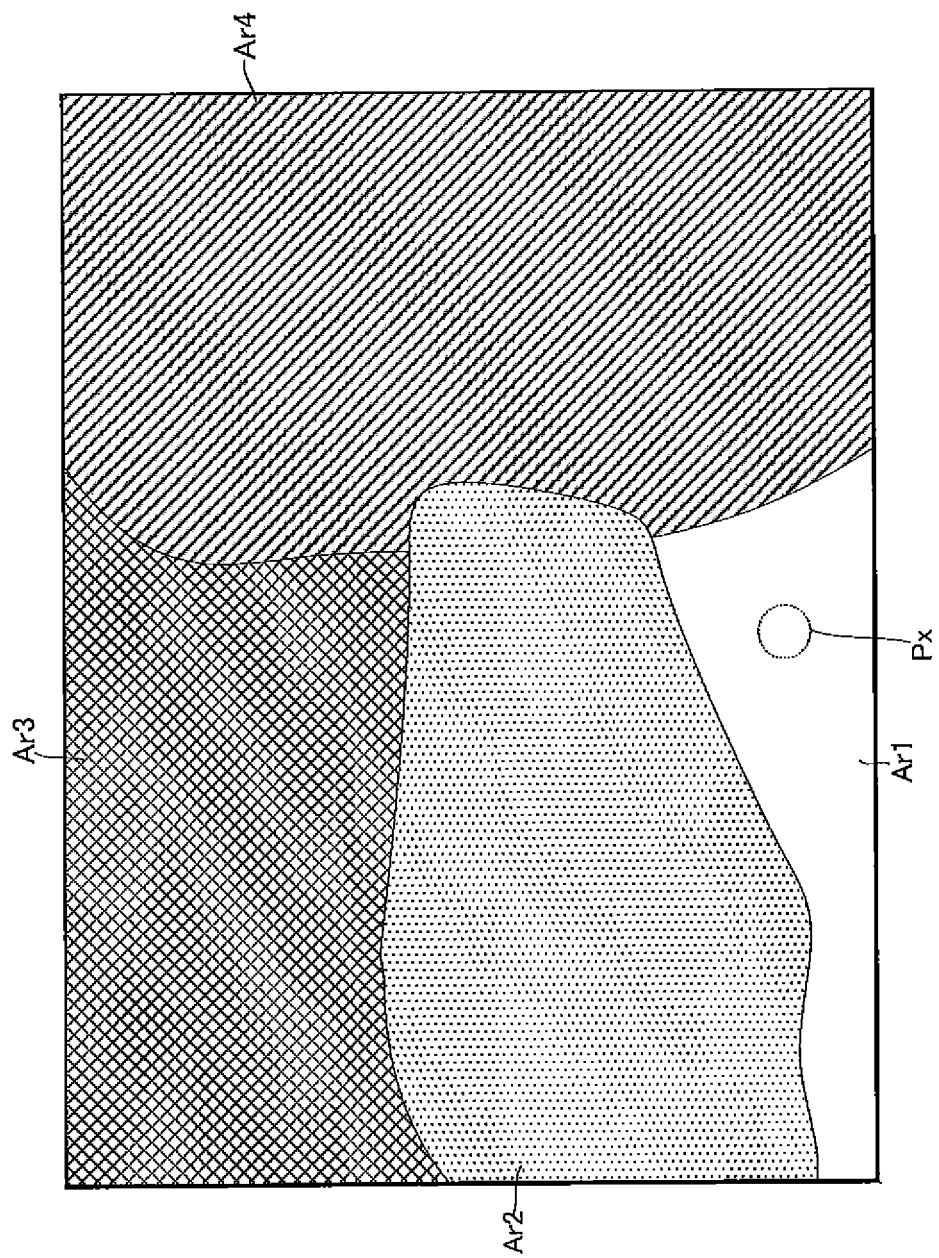
FIG. 5 is a diagram illustrating distribution of ground surface temperatures at a plurality of spots inside a planned release area.

FIG. 5 is a diagram illustrating distribution of ground surface temperatures at a plurality of spots inside the planned release area. In the example of FIG. 5, a partial area Ar1 having a surface temperature of 13° C. to 17° C., a partial area Ar2 having a surface temperature of 18° C. to 22° C., and a partial area Ar3 having a surface temperature of 23° C. to 27° C., and a partial area Ar4 having a surface temperature of 28° C. to 32° C. are illustrated. For example, in a case where a threshold value set in accordance with a category of the article is 18° C., a spot Px inside the partial area Ar1 where the ground surface temperature is less than the threshold value 18° C. is selected as a release spot of the article.

The aerial vehicle control unit 23c varies subsequent processing associated with release of the article by performing the control regarding the release of the article in accordance with the ground surface temperature in the planned release area. For example, in a case where the ground surface temperature in the planned release area is less than the threshold value, the aerial vehicle control unit 23c transmits, to the UAV 1 (or to the UAV 1 via the GCS), a release control command that causes the article to descend to the inside of the planned release area while making the UAV 1 hover in order to release the article. Alternatively, in a case where the ground surface temperature in the planned release area is less than the threshold value, the aerial vehicle control unit 23c transmits, to the UAV 1, a release control command that causes the UAV 1 to land inside the planned release area in order to release the article. Incidentally, in a case where a release spot of the article is selected by the release spot selection unit 23b, the aerial vehicle control unit 23c transmits, to the UAV 1, a release control command that causes the article to descend to the release spot while making the UAV 1 hover, or transmits, to the UAV 1, a release control command that causes the UAV 1 to land on the release spot.

On the other hand, in a case where the ground surface temperature in the planned release area is the threshold value or more, the aerial vehicle control unit 23c performs control to decrease the ground surface temperature in the planned release area, and may confirm a fact that the ground surface temperature has become less than the threshold value. Here, as the control to decrease the ground surface temperature in the planned release area, for example, the aerial vehicle control unit 23c transmits, to the UAV 1, a drive control command that drives the sprinkling mechanism of the UAV 1, or transmits, to a cooling device, a drive control command that drives the cooling device at a port inside the planned release area. Then, after confirming the fact that the ground surface temperature in the planned release area has become less than the threshold value, the aerial vehicle control unit 23c transmits, to the UAV 1, a release control command that causes the article to descend to the inside of the planned release area while making the UAV 1 hover, or transmits, to the UAV 1, a release control command that causes the UAV 1 to land in order to release the article. Moreover, in a case where the ground surface temperature in the planned release area is the threshold value or more, the aerial vehicle control unit 23c may transmit, to the UAV 1, a movement control command that moves the UAV 1 to an area different from the planned release area in order to release the article.

Moreover, even in a case where the ground surface temperature in the planned release area is the threshold value or more, the aerial vehicle control unit 23c confirms the fact that a receiving side of the article that is to be released in the planned release area is prepared for reception, and then transmits, to the UAV 1, a release control command that causes the article to descend while making the UAV 1 hover, or transmits, to the UAV 1, a release control command that causes the UAV 1 to land in order to release the article. Here, confirmation on whether or not the receiving side of the article is prepared for reception is performed by, for example, the aerial vehicle control unit 23c issuing a confirmation notice to the receiving side of the article and receiving an answer indicating completion of the preparation from the receiving side. Consequently, the fact that the receiving side is prepared to receive the article can be surely confirmed.

More specifically, in a case where the receiving side of the article is a user (person), a mobile terminal held by the user receives the confirmation notice by transmitting the confirmation notice (e-mail) to an e-mail address of the user who receives the article in the planned release area. Then, the fact that the receiving side is prepared for reception is confirmed by receiving the answer (e-mail) indicating completion of the preparation from the mobile terminal in response to operation of the user who has confirmed the confirmation notice (e-mail) with the mobile terminal. On the other hand, in a case where a receiving side of the article is a UGV, a confirmation notice is received by the UGV by transmitting the confirmation notice to a communication address of the UGV that receives the article in the planned release area. Then, the fact that the receiving side is prepared for reception is confirmed by receiving an answer indicating completion of the preparation from the UGV that has entered the inside of the planned release area.

[2. Operation of Flight System S]

Next, operation of the flight system S will be described with Example 1 and Example 2 separately. Incidentally, in the operation of the flight system S described below, assume that the control server CS periodically acquires, from the UAV 1 in flight, an aircraft ID and aerial vehicle information of the UAV 1.

Example 1

Figure 6:
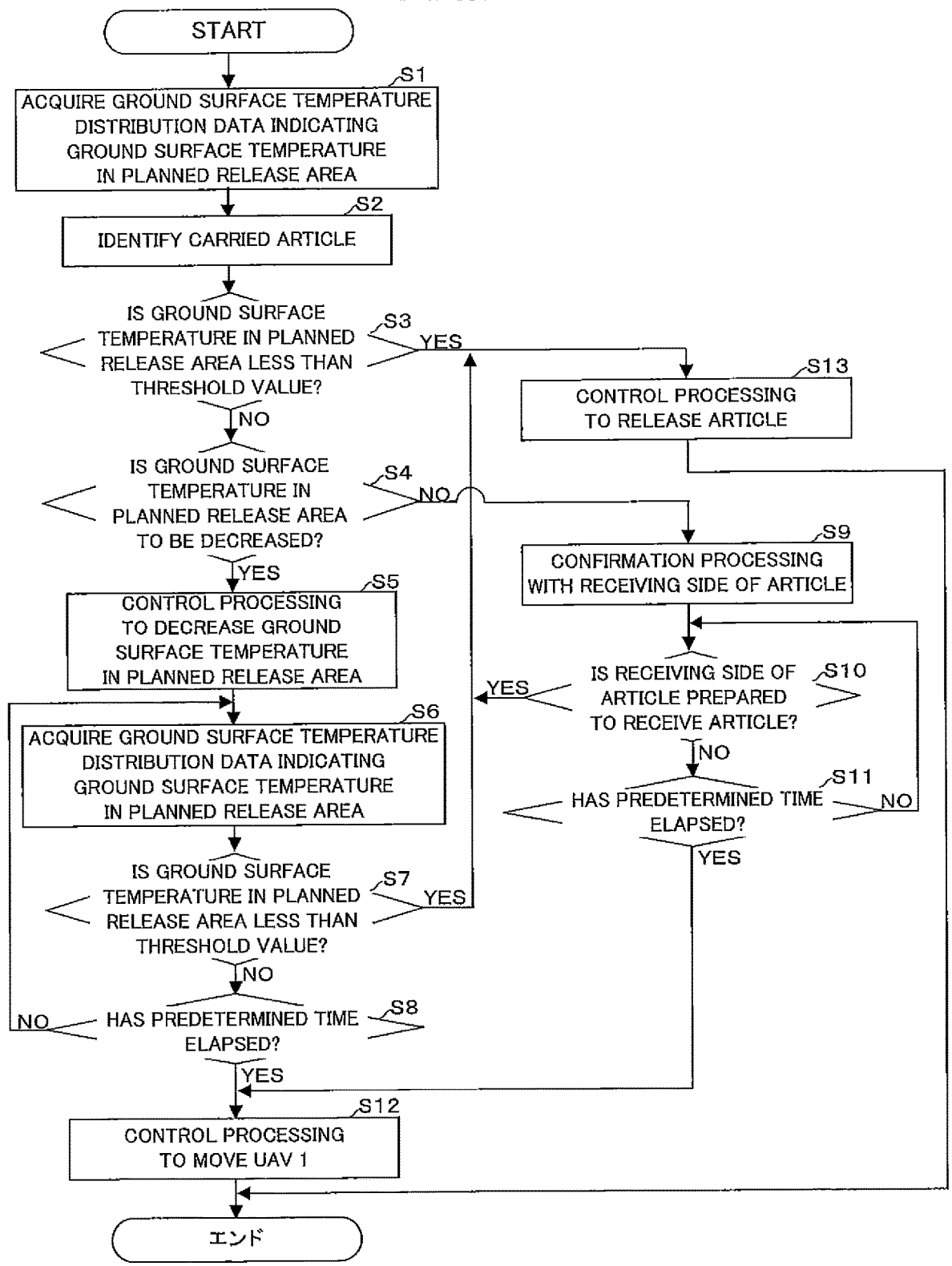
FIG. 6 is a flowchart illustrating exemplary processing executed by the control unit 23 of a control server CS in Example 1.

First, Example 1 of the operation of the flight system S will be described with reference to FIG. 6. Example 1 is an example of a case where the UAV 1 carries one article. FIG. 6 is a flowchart illustrating exemplary processing executed by the control unit 23 of the control server CS in Example 1. Incidentally, the processing illustrated in FIG. 6 may also be performed by the control unit 16 of the UAV 1. The processing illustrated in FIG. 6 is started when the UAV 1 that carries the article arrives at the planned release area of the article. Arrival at the planned release area is determined by whether or not a current position of the UAV 1 has entered the inside of the planned release area or whether or not the current position of the UAV 1 has entered a vicinity range of the planned release area (for example, a range within a radius of several hundred meters from a center of the planned release area) on the basis of, for example, positional information of the UAV 1 and positional information of the planned release area. Such determination is made by the control unit 23. Incidentally, the arrival at the planned release area may also be determined by the UAV 1. In this case, when the UAV 1 determines that the current position of the UAV 1 has entered the planned release area or has entered the vicinity range of the planned release area, the UAV 1 transmits an arrival notice message to the control server CS together with an aircraft ID of the UAV 1.

When the processing illustrated in FIG. 6 is started, the control unit 23 transmits, to the UAV 1, a temperature measurement command for the planned release area. Consequently, ground surface temperature distribution data indicating the ground surface temperature in the planned release area measured by the temperature sensor 15 of the UAV 1 is acquired from the UAV 1 together with the aircraft ID of the UAV 1 (step S1). Next, the control unit 23 identifies, from the storage unit 22, the article (article ID) carried by the UAV 1 on the basis of the aircraft ID acquired in step S1 (step S2).

Next, the control unit 23 determines whether or not the ground surface temperature in the planned release area is less than a threshold value on the basis of the ground surface temperature distribution data acquired in step S1 (step S3). Here, the threshold value is preferably set so as to be varied in accordance with a category of the article identified in step S2. For example, in a case of the article like a refrigerated or frozen food or a fresh food having a high possibility of causing rapid quality degradation (deterioration) due to a high temperature, the threshold value is set low. On the other hand, in a case of the article, such as clothes, having quality unlikely to be degraded due to a high temperature, the threshold value may be set high. Consequently, it is possible to take appropriate measures in accordance with: the category of the article; and the ground surface temperature in the planned release area. In a case where the control unit 23 determines that the ground surface temperature in the planned release area is not less than the threshold value (that is, the threshold value or more) (step S3: NO), the processing proceeds to step S4. On the other hand, in a case where the control unit 23 determines that the ground surface temperature in the planned release area is less than the threshold value (step 33: YES), the processing proceeds to step S13.

In step S4, the control unit 23 determines whether or not to decrease the ground surface temperature in the planned release area. For example, in a case where the UAV 1 is provided with the sprinkling mechanism, the control unit 23 determines to decrease the ground surface temperature in the planned release area. Information on whether or not the UAV 1 is provided with the sprinkling mechanism is acquired from the UAV 1. Alternatively, in a case where a port inside the planned release area is provided with the cooling device, the control unit 23 determines to decrease the ground surface temperature in the planned release area. Information on whether or not the port inside the planned release area is provided with the cooling device is acquired from the PMS 3 that manages the port. In a case where the control unit 23 determines to decrease the ground surface temperature in the planned release area (step S4: YES), the processing proceeds to step S5. On the other hand, in a case where the control unit 23 determines not to decrease the ground surface temperature in the planned release area (step S4: NO), the processing proceeds to step S9.

In step S5, the control unit 23 executes control processing in order to decrease the ground surface temperature in the planned release area. In this control processing, a drive control command that drives the sprinkling mechanism of the UAV 1 is transmitted to the UAV 1 or a drive control command that drives the cooling device at the port inside the planned release area is transmitted to the cooling device as described above. Next, the control unit 23 transmits a temperature measurement command for the planned release area to the UAV 1, thereby acquiring again, from the UAV 1, ground surface temperature distribution data indicating the ground surface temperature in the planned release area remeasured by the temperature sensor 15 of the UAV 1 (step S6).

Next, the control unit 23 determines whether or not the ground surface temperature in the planned release area is less than the threshold value on the basis of the ground surface temperature distribution data acquired again in step S5 (step S7). In a case where the control unit 23 determines that the ground surface temperature in the planned release area is not less than the threshold value (step S7: NO), the processing proceeds to step S8. On the other hand, in a case where the control unit 23 determines that the ground surface temperature in the planned release area is less than the threshold value (step S7: YES), the processing proceeds to step S13.

In step S8, the control unit 23 determines whether or not a predetermined time (for example, 5 to 10 minutes) has elapsed from the processing of step S5. In a case where the control unit 23 determines that the predetermined time has not elapsed yet from the processing of step S5 (step S8: NO), the processing returns to step S6 and repeats the above-described processing. On the other hand, in a case where the control unit 23 determines that the predetermined time has elapsed from the processing of step S5 (step S8: YES), the processing proceeds to step S12.

In step S9, the control unit 23 executes confirmation processing with a receiving side of the article identified in step S2. In this confirmation processing, a confirmation notice is issued to the receiving side of the article as described above. For example, in a case where the receiving side of the article is a user who receives the article in the planned release area, a confirmation notice e-mail is transmitted to an e-mail address of the user. Consequently, the user confirms content of the confirmation notice e-mail received by a mobile terminal. This confirmation notice e-mail preferably describes information including a receiving deadline and a receiving position of the article carried by the UAV 1 (information like "please come to receive the article A at Y (receiving position) within X minutes (receiving deadline) from now").

Here, the receiving deadline X of the article may be set so as to be varied in accordance with a surface temperature in the planned release area. For example, the higher the surface temperature is, the shorter the receiving deadline is to be set. Alternatively, the receiving deadline X of the article may be set so as to be varied in accordance with a category of the article. For example, in a case of the article like a refrigerated or frozen food or a fresh food having a high possibility of causing rapid quality degradation due to a high temperature, the receiving deadline is set short. Moreover, preferably, the mobile terminal of the user displays the receiving position Y of the article on a map that indicates the planned release area. After the confirmation notice is confirmed by the user, an answer e-mail indicating completion of preparation is transmitted from the mobile terminal to the control server CS in response to operation of the user.

Incidentally, in step S9, the control unit 23 acquires image data (face image data of a person or mark image data of a UGV) captured by the imaging unit 14 of the UAV 1 from the sky above the planned release area, and the acquired image data may be collated with image data (face image data of the person or mark image data of the UGV) included in information on the receiving side of the article (face authentication or mark authentication).

Next, the control unit 23 determines whether or not the receiving side of the article that is to be released in the planned release area is prepared for reception (step S10). For example, in a case of receiving an answer indicating completion of the preparation from the receiving side of the article in response to the confirmation notice in step S9, or in a case where the collation (face authentication or mark authentication) using the image data is successful, the control unit 23 determines that the receiving side is prepared for reception. In a case where the control unit 23 determines that the receiving side of the article is prepared for reception (step S10: YES), the processing proceeds to step S13. On the other hand, in a case where the control unit 23 determines that the receiving side of the article is not prepared for reception (step S10: NO), the processing proceeds to step S11.

In step S11, the control unit 23 determines whether or not a predetermined time (for example, 20 to 30 minutes) has elapsed from the processing of step S9. In a case where the control unit 23 determines that the predetermined time has not elapsed yet from the processing of step S9 (step S11: NO), the processing returns to step S10 and repeats the above-described processing. On the other hand, in a case where the control unit 23 determines that the predetermined time has elapsed from the processing of step S9 (step S11: YES), the processing proceeds to step S12.

In step S12, the control unit 23 executes control processing in order to move the UAV 1, and ends the processing illustrated in FIG. 6. In this control processing, a movement control command that moves the UAV 1 to an area different from the planned release area is transmitted to the UAV 1 in order to release the article as described above. Consequently, for example, the UAV 1 is moved to the different area, lands on the different area (for example, another port or the like), and waits until the ground surface temperature in the planned release area is decreased. Alternatively, the UAV 1 releases the article in the different area and transfers the article to the receiving side of the article. Incidentally, the UAV 1 may also give up transferring of the article to the receiving side, and may be moved to the different area to collect the article.

In step S13, the control unit 23 executes control processing in order to release the article, and ends the processing illustrated in FIG. 6. In this control processing, a release control command that causes the article to descend to the inside of the planned release area while making the UAV 1 hover is transmitted to the UAV 1, or a release control command that causes the UAV 1 to land inside the planned release area is transmitted to the UAV 1 in order to release the article as described above. Consequently, the article is transferred to the receiving side by releasing the article, for example, when the article is made to descend and reaches the ground by a reel, a winch, or the like from the UAV 1 that is hovering inside the planned release area. Alternatively, the article is transferred to the receiving side by releasing the article from the UAV 1 that has landed inside the planned release area. After the article is thus released, the UAV 1 returns.

Example 2

Figure 7:
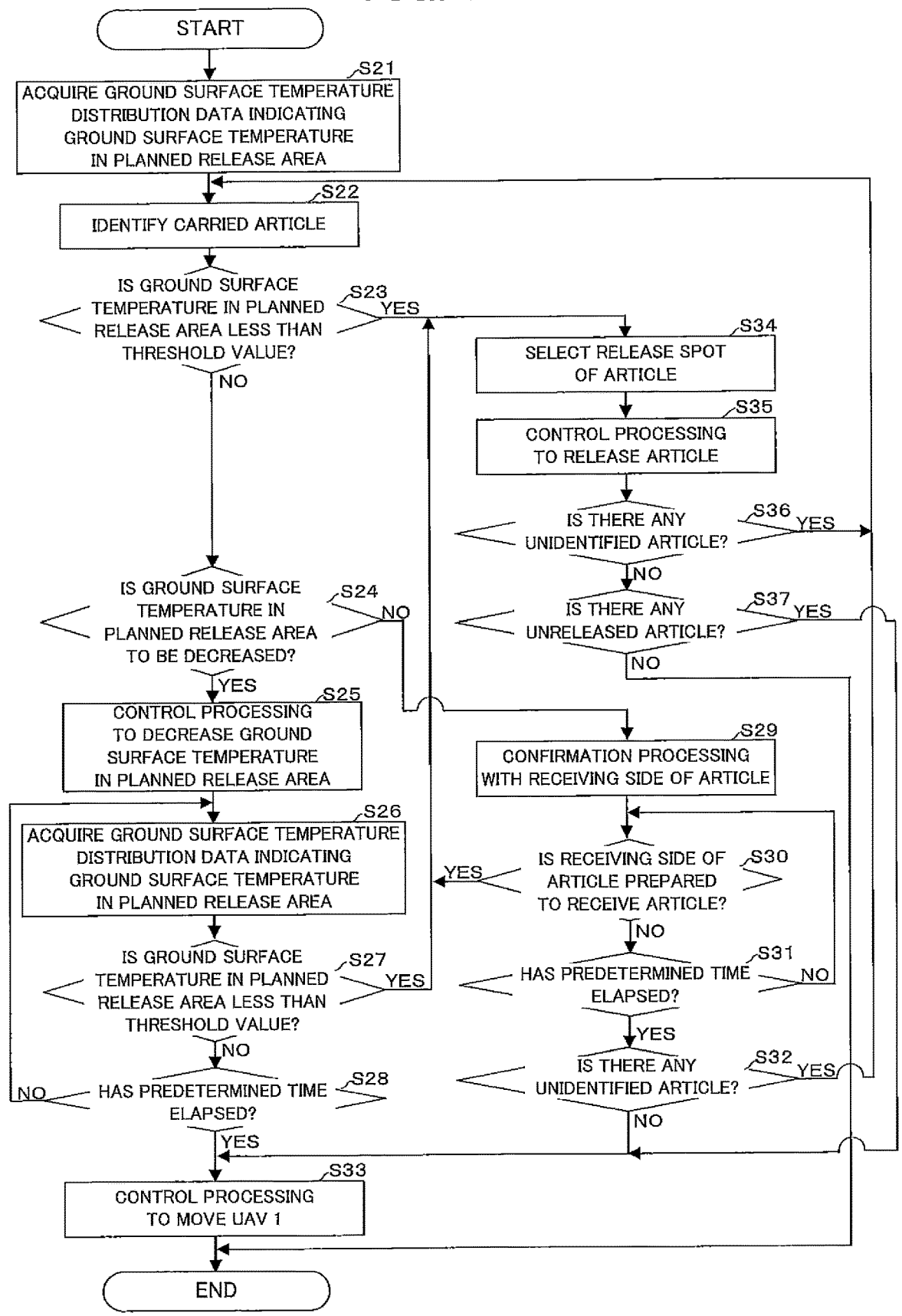
FIG. 7 a flowchart illustrating exemplary processing executed by the control unit 23 of the control server CS in Example 2.

Next, Example 2 of the operation of the flight system S will be described with reference to FIG. 7. Example 2 is an example of a case where the UAV 1 carries a plurality of articles. FIG. 7 is a flowchart illustrating exemplary processing executed by the control unit 23 of the control server CS in Example 2. Incidentally, the processing illustrated in FIG. 7 may also be performed by the control unit 16 of the UAV 1. Similar to the processing illustrated in FIG. 6, the processing illustrated in FIG. 7 is started when the UAV 1 that carries the articles arrives at the planned release area of the articles. The processing of steps S21 and S22 illustrated in FIG. 7 is similar to the processing of steps S1 and S2 illustrated in FIG. 6.

In step S23, the control unit 23 determines, on the basis of ground surface temperature distribution data acquired in step S21, whether or not there is any spot where the ground surface temperature is less than a threshold value out of a plurality of spots inside the planned release area. Here, the threshold value is preferably set so as to be varied in accordance with a category of each of the articles identified in step S22 in a manner similar to Example 1. In a case where the control unit 23 determines that none of the plurality of spots inside the planned release area has the ground surface temperature less than the threshold value (step S23: YES), the processing proceeds to step S24. On the other hand, in a case where the control unit 23 determines that there is a spot where the ground surface temperature is less than the threshold value out of the plurality of spots inside the planned release area (step S23: YES), the processing proceeds to step S34.

In step S24, the control unit 23 determines whether or not to decrease the ground surface temperature in the planned release area in a manner similar to step S4 illustrated in FIG. 6. In a case where the control unit 23 determines to decrease the ground surface temperature in the planned release area (step S24: YES), the processing proceeds to step S25. On the other hand, in a case where the control unit 23 determines not to decrease the ground surface temperature in the planned release area (step S24: NO), the processing proceeds to step S29.

In step S25, the control unit 23 executes control processing in order to decrease the ground surface temperature in the planned release area in a manner similar to step S5 illustrated in FIG. 6. Next, the control unit 23 acquires again, from the UAV 1, ground surface temperature distribution data indicating the ground surface temperature in the planned release area by transmitting, to the UAV 1, a temperature measurement command for the planned release area (step S26) in a manner similar to step S6 illustrated in FIG. 6.

Next, the control unit 23 determines, on the basis of the ground surface temperature distribution data acquired again in step S26, whether or not there is any spot where the ground surface temperature is less than the threshold value out of the plurality of spots inside the planned release area (step S27). In a case where the control unit 23 determines that none of the plurality of spots inside the planned release area has the ground surface temperature less than the threshold value (step S27: NO), the processing proceeds to step S28. On the other hand, in a case where the control unit 23 determines that there is a spot where the ground surface temperature is less than the threshold value out of the plurality of spots inside the planned release area (step S27: YES), the processing proceeds to step S34.

In step S28, the control unit 23 determines whether or not a predetermined time has elapsed from the processing of step S25. In a case where the control unit 23 determines that the predetermined time has not elapsed yet from the processing of step S25 (step S28: NO), the processing returns to step S26 and repeats the above-described processing. On the other hand, in a case where the control unit 23 determines that the predetermined time has elapsed from the processing of step S25 (step S28: YES), the processing proceeds to step S33.

In step S29, the control unit 23 executes confirmation processing with a receiving side of the article identified in step S22 in a manner similar to step S9 illustrated in FIG. 6. Next, the control unit 23 determines whether or not the receiving side of the article that is to be released is prepared for reception at the release spot inside the planned release area (step S30) in a manner similar to step S10 illustrated in FIG. 6. In a case where the control unit 23 determines that the receiving side of the article that is to be released at the release spot is not prepared for reception (step S30: NO), the processing proceeds to step S31. On the other hand, in a case where the control unit 23 determines that the receiving side of the article that is to be released at the release spot is prepared for reception (step S30: YES), the processing proceeds to step S34.

In step S31, the control unit 23 determines whether or not the predetermined time has elapsed from the processing of step S29. In a case where the control unit 23 determines that the predetermined time has not elapsed yet from the processing of step S29 (step S31: NO), the processing returns to step S30 and repeats the above-described processing. On the other hand, in a case where the control unit 23 determines that the predetermined time has elapsed from the processing of step S29 (step S31: YES), the processing proceeds to step S32.

In step S32, the control unit 23 determines whether or not there is any article not yet identified (unidentified article) in step S22 out of the articles carried by the UAV 1. In a case where the control unit 23 determines that there is an unidentified article (step S32: YES), the processing returns to step S22 to identify the unidentified article, and repeats the above-described processing. On the other hand, in a case where the control unit 23 determines that there is no unidentified article (step S32: NO), the processing proceeds to step S33. In step S33, the control unit 23 executes control processing in order to move the UAV 1 in a manner similar to step S12 illustrated in FIG. 6, and ends the processing illustrated in FIG. 7.

In step S34, the control unit 23 selects, as a release spot for the article (that is, the article identified in step S22), a spot where the ground surface temperature in the planned release area is less than the threshold value. Next, the control unit 23 executes the control processing in order to release the article (step S35). In this control processing, as described above, a release control command that causes the article to descend to the release spot while making the UAV 1 hover is transmitted to the UAV 1, or a release control command that causes the UAV 1 to land at the release spot is transmitted to the UAV 1 in order to release the article. Consequently, the article is transferred to the receiving side by releasing the article when the article is made to descend and reaches the release spot by a reel, a winch, or the like from the UAV 1 that is hovering. Alternatively, the article is transferred to the receiving side by releasing the article from the UAV 1 that has landed on the release spot. After the article is thus released, the UAV 1 returns.

Next, the control unit 23 determines whether or not there is any article not identified (unidentified article) in step S22 out of the articles carried by UAV 1 (step S36). In a case where the control unit 23 determines that there is an unidentified article (step S36: YES), the processing returns to step S22 to identify the unidentified article, and repeats the above-described processing. Consequently, a spot where the ground surface temperature in the planned release area is less than the threshold value (threshold value set in accordance with a category of each article) is to be selected as a release spot for each article. On the other hand, in a case where the control unit 23 determines that there is no unidentified article (step S36: NO), the processing proceeds to step S37.

In step S37, the control unit 23 determines whether or not there is the article not released from the UAV 1 (an unreleased article) out of the articles carried by the UAV 1. In a case of determining that there is an unreleased article (step S37: YES), the control unit 23 executes control processing in order to move the UAV 1 (step S33), and ends the processing illustrated in FIG. 7. On the other hand, in a case of determining that there is no unreleased article (step S37: NO), the control unit 23 ends the processing illustrated in FIG. 7.

As described above, according to the above-described embodiment, the ground surface temperature in the planned release area measured by the temperature sensor 15 of the UAV 1 is acquired, and the control regarding the release of the article is performed in accordance with the ground surface temperature in the planned release area, and therefore, it is possible to prevent the article from being adversely affected by the ground surface temperature in the planned release area of the article that is a carrying object (for example, it is possible to suppress quality deterioration of the article).

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above-described embodiment, the description has been provided while exemplifying the article as a carrying object, but the present invention is also applicable to a case where the carrying object is a person or an animal. For example, in a case where the ground surface temperature in the planned release area is less than the threshold value, the control unit either causes a person (e.g., passenger) to descend while making an aerial vehicle hover or causes the aerial vehicle (e.g., a flying taxi) to land in order to release the person. On the other hand, in a case where the ground surface temperature in the planned release area is the threshold value or more, the control unit moves the aerial vehicle to an area different from the planned release area in order to release the person. Consequently, it is possible to prevent the person from being adversely affected by the ground surface temperature in the planned release area. In other words, it is possible to prevent the person from descending to an undesired hot ground.

Moreover, the present invention is also applicable to a manned aerial vehicle capable of flying without presence of a manipulator (pilot) inside the aerial vehicle. Moreover, in the above-described embodiment, release of a carrying object is controlled in accordance with the ground surface temperature in the planned release area, however, landing of an aerial vehicle may also be controlled in accordance with the ground surface temperature in a planned landing area of an aerial vehicle (e.g., the UAV 1). Consequently, it is possible to prevent the aerial vehicle from being adversely affected by the ground surface temperature in the planned landing area. For example, in a case where the ground surface temperature in the planned landing area of the aerial vehicle is less than the threshold value, the control unit 16 or 23 causes the aerial vehicle to land in the planned landing area in a manner similar to the above-described embodiment. On the other hand, in a case where the ground surface temperature in the planned landing area of the aerial vehicle is the threshold value or more, the control unit 16 or 23 performs control in order to decrease the ground surface temperature, and causes the aerial vehicle to land in this area after confirming that the ground surface temperature has become less than the threshold value. The control processing to decease the ground surface temperature in the planned landing area is similar to that of the above-described embodiment. Moreover, in a case where the ground surface temperature in the planned landing area is the threshold value or more, the control unit 16 or 23 may move the aerial vehicle to an area different from the area. Moreover, the control unit 16 or 23 may select, as a landing spot of an aerial vehicle, a spot where the ground surface temperature is less than the threshold value on the basis of distribution of ground surface temperatures at a plurality of spots inside the planned landing area of the aerial vehicle, and may cause the aerial vehicle to land on the selected spot.

REFERENCE SIGNS LIST

1 UAV
2 UTMS
3 PMS
11 Drive unit
12 Positioning unit
13 Radio communication unit
14 Imaging unit
15 Temperature sensor
16 Control unit
21 Communication unit
22 Storage unit
23 Control unit
23*a* Ground surface temperature acquisition unit
23*b* Release spot selection unit
23*c* Aerial vehicle control unit CS Control server
S Flight system

The invention claimed is:

1. A control device configured to control an aerial vehicle that carries a carrying object and includes a sensor capable of measuring a ground surface temperature during flight, the control device comprising:
at least one memory configured to store program code; and at least one processor configured to access the program code and operate as instructed by the program code, the program code including:
acquisition code configured to cause the at least one processor to acquire a ground surface temperature in an area where the carrying object is planned to be released, the ground surface temperature being measured by the sensor; and
control code configured to cause the at least one processor to:
perform, based on the ground surface temperature in the area being less than a threshold value, control to release the carrying object in the area, without checking whether a receiving side of the carrying object in the area is prepared for reception; and
perform, based on the ground surface temperature in the area being the threshold value or more, control to release the carrying object in the area upon a determination that the receiving side of the carrying object in the area is prepared for reception.

2. The control device according to claim 1, wherein in a case where the ground surface temperature in the area is less than the threshold value, the control code causes the at least one processor to cause the carrying object to descend while making the aerial vehicle hover in order to release the carrying object.

3. The control device according to claim 2, wherein the threshold value is set in accordance with a category of the carrying object.

4. The control device according to claim 1, wherein in a case where the ground surface temperature in the area is less than the threshold value, the control code causes the at least one processor to cause the aerial vehicle to land in order to release the carrying object.

5. The control device according to claim 1, wherein in a case where the ground surface temperature in the area is the threshold value or more, the control code causes the at least one processor to perform control to decrease the ground surface temperature, confirm that the ground surface temperature has become less than the threshold value, and then causes the carrying object to descend while making the aerial vehicle hover in order to release the carrying object.

6. The control device according to claim 1, wherein in a case where the ground surface temperature in the area is the threshold value or more, the control code causes the at least one processor to perform control to decrease the ground surface temperature, confirm that the ground surface temperature has become less than the threshold value, and then causes the aerial vehicle to land in order to release the carrying object.

7. The control device according to claim 1, wherein in a case where the ground surface temperature in the area is the threshold value or more, the control code causes the at least one processor to, upon the determination that the receiving side of the carrying object in the area is prepared for reception, cause the aerial vehicle to land in order to release the carrying object.

8. The control device according to claim 1, wherein the control code causes the at least one processor to issue a confirmation notice to the receiving side of the carrying object, and confirm that the receiving side is prepared for reception by receiving an answer indicating completion of preparation from the receiving side.

9. The control device according to claim 1, wherein the control code causes the at least one processor to, based on the ground surface temperature in the area being the threshold value or more, makes the determination that the receiving side is prepared for reception by recognizing the receiving side of the carrying object from an image captured by a camera provided in the aerial vehicle.

10. The control device according to claim 1, wherein in a case where the ground surface temperature in the area is the threshold value or more, the control code causes the at least one processor to move the aerial vehicle to an area different from the area in order to release the carrying object.

11. The control device according to claim 1, the program code further including selection code configured to cause the at least one processor to select, as a spot where the carrying object is released, a spot where the ground surface temperature is less than the threshold value on the basis of distribution of ground surface temperatures at a plurality of spots inside the area.

12. The control device according to claim 11, wherein the aerial vehicle carries a plurality of carrying objects of different categories, and the selection code causes the at least one processor to select, as a spot where the carrying object is released, a spot where the ground surface temperature is less than the threshold value for each of the plurality of carrying objects on the basis of the distribution of the ground surface temperatures at the plurality of spots inside the area.

13. The control device according to claim 1, wherein the determination is based on capturing an image by a camera provided in the aerial vehicle, comparing an object image included in the captured image with a corresponding object image that is pre-registered, and determining that the receiving side is prepared for reception based on a degree of coincidence between the object images is a threshold value or more.

14. A control method executed by a system that controls an aerial vehicle configured to carry a carrying object, the aerial vehicle including a sensor capable of measuring a ground surface temperature during flight, the control method including:

acquiring a ground surface temperature in an area where the carrying object is released, the ground surface temperature being measured by the sensor;

performing, based on the ground surface temperature in the area being less than a threshold value, control to release the carrying object in the area, without checking whether a receiving side of the carrying object in the area is prepared for reception; and performing, based on the ground surface temperature in the area being the threshold value or more, control to release the carrying object in the area upon a determination that the receiving side of the carrying object in the area is prepared for reception.

15. A control device configured to control an aerial vehicle configured to carry a carrying object, the aerial vehicle including a sensor capable of measuring a ground surface temperature during flight, the control device comprising:

at least one memory configured to store program code; and at least one processor configured to access the program code and operate as instructed by the program code, the program code including:

acquisition code configured to cause the at least one processor to acquire a ground surface temperature in an area where the aerial vehicle is planned to land, the ground surface temperature being measured by the sensor; and control code configured to cause the at least one processor to:

perform, based on the ground surface temperature in the area being less than a threshold value, control to release the carrying object in the area, without checking whether a receiving side of the carrying object in the area is prepared for reception; and perform, based on the ground surface temperature in the area being the threshold value or more, control to release the carrying object in the area upon a determination that the receiving side of the carrying object in the area is prepared for reception.

\* \* \* \* \*